United States Patent
DeLuca et al.

(10) Patent No.: US 11,620,328 B2
(45) Date of Patent: Apr. 4, 2023

(54) SPEECH TO MEDIA TRANSLATION

(71) Applicant: International Business Machines Corporation, Armonk, NY (US)

(72) Inventors: Lisa Seacat DeLuca, Baltimore, MD (US); Muhammad Jawad Paracha, Karachi (PK)

(73) Assignee: International Business Machines Corporation, Armonk, NY (US)

(*) Notice: Subject to any disclaimer, the term of this patent is extended or adjusted under 35 U.S.C. 154(b) by 252 days.

(21) Appl. No.: 16/987,547

(22) Filed: Aug. 7, 2020

(65) Prior Publication Data
US 2021/0397644 A1 Dec. 23, 2021

(30) Foreign Application Priority Data
Jun. 22, 2020 (PK) .................................... 410/2020

(51) Int. Cl.
| | | |
|---|---|---|
| *G10L 15/26* | (2006.01) | |
| *G06F 16/532* | (2019.01) | |
| *G06F 16/732* | (2019.01) | |
| *G10L 15/00* | (2013.01) | |

(52) U.S. Cl.
CPC .......... *G06F 16/532* (2019.01); *G06F 16/732* (2019.01); *G10L 15/005* (2013.01); *G10L 15/26* (2013.01)

(58) Field of Classification Search
CPC ...... G06F 16/532; G06F 16/732; G06F 40/40; G10L 15/005; G10L 15/00; G10L 15/26; G10L 15/08
See application file for complete search history.

(56) References Cited

U.S. PATENT DOCUMENTS

| | | | |
|---|---|---|---|
| 6,377,925 B1 | 4/2002 | Greene, Jr. et al. | |
| 6,415,257 B1* | 7/2002 | Junqua | H04N 21/42203 704/275 |
| 8,738,355 B2 | 5/2014 | Gupta et al. | |
| 2003/0023424 A1 | 1/2003 | Weiner | |
| 2004/0111272 A1 | 6/2004 | Gao et al. | |
| 2006/0127872 A1* | 6/2006 | Marggraff | G06F 3/0481 434/353 |
| 2017/0262433 A1* | 9/2017 | Chester | G06N 3/0454 |
| 2019/0108773 A1* | 4/2019 | Wyner | G09B 19/06 |
| 2020/0097604 A1* | 3/2020 | Lee | G06N 3/0445 |

(Continued)

OTHER PUBLICATIONS

C. Sun et al., "Kinect-Based Visual Communication System", ICIMCS'12, ACM, Sep. 9-11, 2012, Wuhan, China, 5 pages.

(Continued)

*Primary Examiner* — Huyen X Vo
(74) *Attorney, Agent, or Firm* — Edell, Shapiro & Finnan, LLC

(57) ABSTRACT

According to one embodiment of the present invention, a system for speech to media translation includes at least one processor. The at least one processor may be configured to receive an input in a first language and receive a command to translate the input. The input is one of text and audio. The at least one processor may be further configured to search an image database based on the input to retrieve contextually relevant images. The at least one processor may be configured to communicate the retrieved contextually relevant image to a target user.

17 Claims, 6 Drawing Sheets

(56) References Cited

U.S. PATENT DOCUMENTS

2020/0117713 A1\* 4/2020 Ray .................. G10L 13/10

OTHER PUBLICATIONS

D. Terdiman, "AI for Matching Images With Spoken Word Gets a Boost From MIT", https://www.fastcompany.com/3067904/ai-for-matching-images-with-spoken-word-gets-a-boost-from-mit, Robot Revolution, Feb. 7, 2017, 18 pages.

P. Miller, "IBM's speech recognition technology headed for trial use in Iraq", https://www.engadget.com/2006/10/13/ibms-speech-recognition-technology-headed-for-trial-use-in-iraq/, Engadget, Oct. 13, 2006, 4 pages.

\* cited by examiner

SPEECH TO MEDIA TRANSLATION

BACKGROUND

1. Technical Field

Present invention embodiments relate to language translations and, more specifically, to translating speech and/or text from a first language to one or more images and/or videos in order to facilitate a better understanding of the first language by users that do not speak or read the first language.

2. Discussion of the Related Art

There are many locations in the world where multiple languages are spoken, or where a lack of education prevents some people from being able to read and write. Oftentimes, these people resort to telling stories through pictures or images in order to communicate with others. While there are current text translators or translation services that provide translations of source text or spoken word from one spoken language to a target language, these translators or translation services are not capable of converting source text or spoken word into contextually relevant media that further enhances the understanding of the translation. Furthermore, with current text translators, it can often be difficult for users to continuously read sentences or listen to a computer-generated voice while also trying to simultaneously listen to and engage with another user that is speaking in another language and providing relevant gestures and facial expressions.

SUMMARY

According to one embodiment of the present invention, a system for translating speech to media includes at least one processor. The at least one processor may be configured to receive an input in a first language and receive a command to translate the input into a second language. The input is one of text and audio. The at least one processor may be further configured to search an image database based on the input to retrieve contextually relevant images. The at least one processor may be configured to communicate retrieved contextually relevant images to a target user.

Furthermore, the input is received from a first user and the image database is a personal image database. Additionally, the personal image database is on a mobile device of one of the users or on a cloud repository. The input may also be received from a first user and the image database is a public image database. The at least one processor may be further configured to search a video database based on the input to retrieve contextually relevant videos, and then communicate the retrieved contextually relevant videos to the target user. In addition, the input is received from a first user, and the at least one processor may be configured to prompt the target user to draw an image via an interface of a mobile device of the target user, and to communicate the image drawn by the target user to the first user. The at least one processor may also be configured to communicate a translation of the input from the first language to the second language to the target user. A textual translation and/or an audio translation may not be communicated to the target user.

BRIEF DESCRIPTION OF THE DRAWINGS

Generally, like reference numerals in the various figures are utilized to designate like components.

Like reference numerals have been used to identify like elements throughout this disclosure.

DETAILED DESCRIPTION

Figure 1:
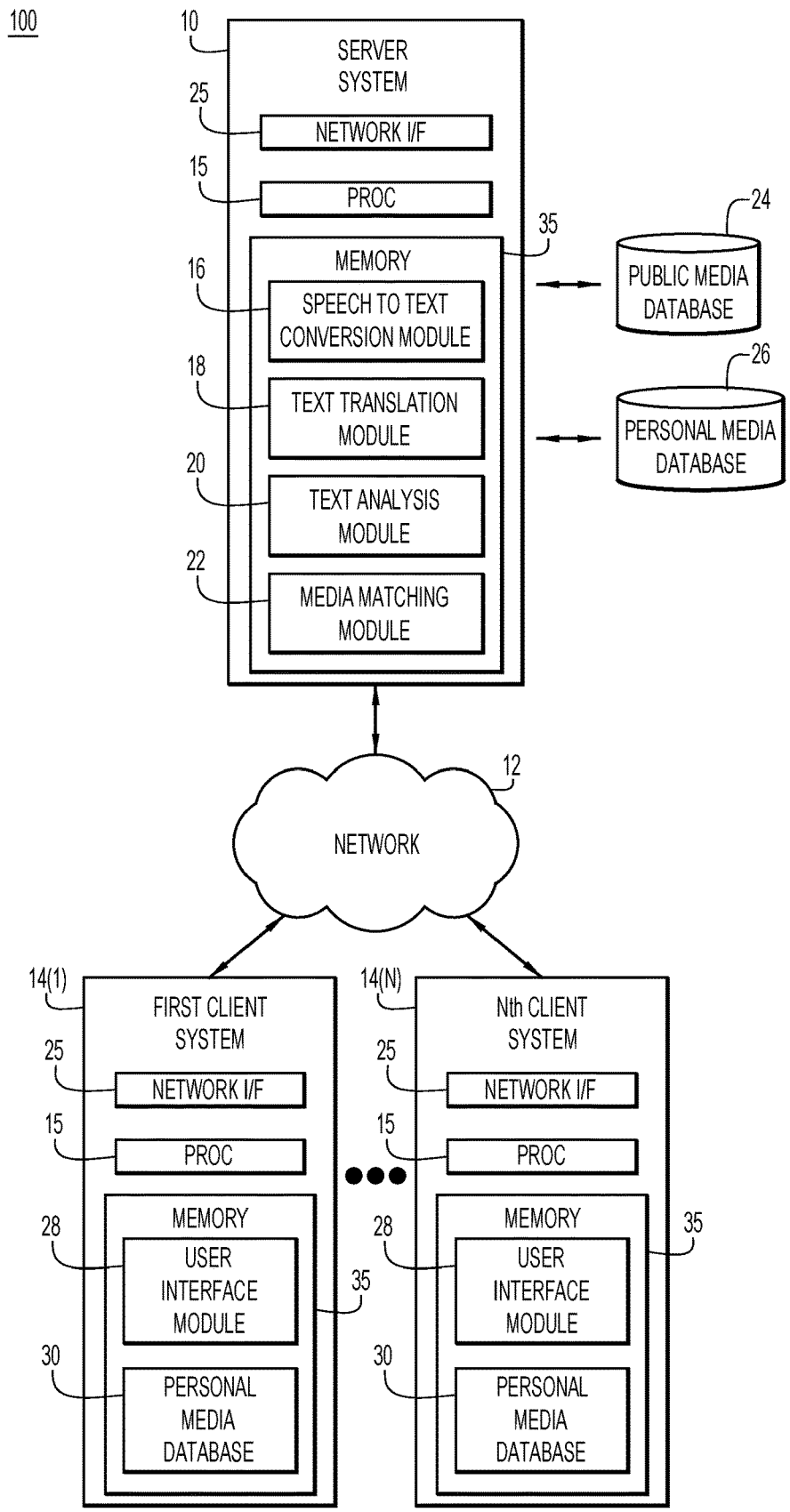
FIG. 1 is a diagrammatic illustration of an example of a computing environment for use with an embodiment of the present invention.

The present invention embodiments pertain to a system and method for translating text or speech from a first language into contextually relevant media for presentation to target users that do not understand the first language. The system may allow a first user to provide an input by either speaking into their user device or by typing a textual message into their user device. If the received input was speech, the system may then process the received speech input into text. The system may translate the text, whether the text is the input or is converted from the speech, from the first language to a second language(s) of the target user(s). The system will automatically analyze the text to determine sentence structure and any complex phrases. Once the system has gained an understanding of the structure of the text, the system will then automatically search a series of databases for contextually relevant media (e.g., images, videos, etc.) that accurately represent the input from the first user. The series of databases may be cloud-based repositories of personal media of the first user or target users, may be local repositories of personal media located on the user devices of the first user or the target users, or may be publicly accessible cloud-based repositories. The system may search the personal media databases and repositories for contextually relevant media before searching public media databases and repositories for contextually relevant media. In some embodiments, only after no contextually relevant media can be found in the personal media databases and repositories will the system search the public media databases and repositories. Once contextually relevant media is located in one of the databases and repositories, the system will send the contextually relevant media to the target users. In some embodiments, the system may embed or impose the translation of the input received from the first user in the contextually relevant media to provide further contextual relevance and understanding to the target users.

Current text translators are only capable of translating text or speech from one language to another, and are not capable of converting text or speech to contextually relevant media. When attempting to converse with another person speaking in an unfamiliar language, it can be difficult to stay engaged in the conversation while trying to simultaneously read text translations of what the person is saying. It is often easier for a person to simply look at an image to gain an understanding of a phrase, sentence, or series of sentences, rather than read the phrase, sentence, or series of sentences. Furthermore, while systems exist that enable a user to search for a phrase and that may return relevant media to the user, these systems merely search their own privately indexed databases, or search only publically available databases. These current systems are not capable of searching the personal media databases and repositories of the users that are communicating with each other, and are also not capable of simultaneously translating the received input. The present invention embodiments may be used to display contextually relevant media, with or without text translations, to target users when inputs (i.e., text or speech) are received from a first user that is conversing with the target users. By searching through personal media databases and repositories prior to searching through public media databases and repositories, the present invention embodiments are able to provide and present media to the target users that provide a greater understanding and are more representative of the input than simply searching publically available media databases and repositories. Thus, the present invention embodiments enable two or more users to communicate with one another through the presentation of contextually relevant media when the two or more users have different native languages.

An example environment for use with present invention embodiments is illustrated in FIG. 1. Specifically, the environment includes one or more server systems 10, and one or more client or end-user systems 14(1)-14(N). Server systems 10 and client systems 14(1)-14(N) may be remote from each other and communicate over a network 12. The network 12 may be implemented by any number of any suitable communications media (e.g., wide area network (WAN), local area network (LAN), Internet, Intranet, etc.). Alternatively, server systems 10 and client systems 14(1)-14(N) may be local to each other, and communicate via any appropriate local communication medium (e.g., local area network (LAN), hardwire, wireless link, Intranet, etc.).

Client systems 14(1)-14(N) enable a user to submit an input (e.g., speech input, text input, media input, etc.) to server systems 10 in order for the server systems 10 to translate the speech/text input from a first language to a second language, to locate contextually relevant media (e.g., images, videos, etc.) based on the received speech/text input, to send the contextually relevant media to target users that do not speak the same language as the user, to convert the received media to contextually relevant speech/text, and to send the contextually relevant speech/text to target users that do not speak the same language as the user. The server systems 10 include a speech to text conversion module 16 that converts a speech input to text or that converts text into speech, a text translation module 18 that translates the converted text from a first language to one or more second languages, a text analysis module 20 that is capable of analyzing text for complex phrases and sentence structures, and a media matching module 22 that is configured to locate and retrieve contextually relevant media files based on the received speech/text or that is configured to determine contextually relevant text from received media files. A public media database system 24 and one or more personal media database systems 26 may store various media type files (e.g., images, videos, etc.) that the server systems 10 may search through for contextually relevant media. The database systems 24, 26 may be implemented by any conventional or other database or storage unit, may be local to or remote from server systems 10 and client systems 14(1)-14(N), and may communicate via any appropriate communication medium (e.g., local area network (LAN), wide area network (WAN), Internet, hardwire, wireless link, Intranet, etc.). The client systems 14(1)-14(N) may include a user interface module 28 that presents a graphical user (e.g., GUI, etc.) or other interface (e.g., command line prompts, menu screens, etc.) to solicit information from users pertaining to inputs, translation, and media/text retrieval (e.g., language translation selection, media matching feedback, target user identification, etc.). The client systems 14(1)-14(N), may have local personal media database systems 30 that may store various media type files (e.g., images, videos, etc.) locally on the client systems 14(1)-14(N) that may also be search through for contextually relevant media by the server systems 10.

Server systems 10 and client systems 14(1)-(N) may be implemented by any conventional or other computer systems. In some embodiments, these computer systems may be equipped with a display or monitor, a base (e.g., including at least one hardware processor 15 (e.g., microprocessor, controller, central processing unit (CPU), etc.), one or more memories 35 and/or internal or external network interfaces or communications devices 25 (e.g., modem, network cards, etc.)), optional input devices (e.g., a keyboard, mouse, microphone, or other input device), and any commercially available and custom software (e.g., server/communications software, user interface module, audio recording software, browser/interface software, etc.).

Alternatively, one or more client systems 14(1)-14(N), when operating as a stand-alone unit, may analyze the inputs to determine whether or not the inputs are speech or text, may convert the speech to text, and may search databases and repositories for images representative of the input text or converted text. In a stand-alone mode of operation, the client systems 14(1)-14(N) store or have access to the data (e.g., media databases/repositories, language translation data, speech to text conversion data, textual context data, sentence structure data, etc.), and may include modules to convert speech to text, translate the text from one language to another, analyze the text to identify different contexts of the sentence structure. The graphical user (e.g., GUI, etc.) or other interface (e.g., command line prompts, menu screens, series of visual indicators, etc.) solicits information from a corresponding user pertaining to the inputs and analysis, and may provide media (e.g., images, videos, etc.) that represent the inputs.

Modules 16, 18, 20, 22, 28 may include one or more modules or units to perform the various functions of present invention embodiments described below. The various modules (e.g., speech to text conversion module 16, text translation module 18, text analysis module 20, media matching module 22, and user interface module 28) may be implemented by any combination of any quantity of software and/or hardware modules or units, and may reside within memory 35 of the server and/or client systems for execution by processor 15.

Figure 2:
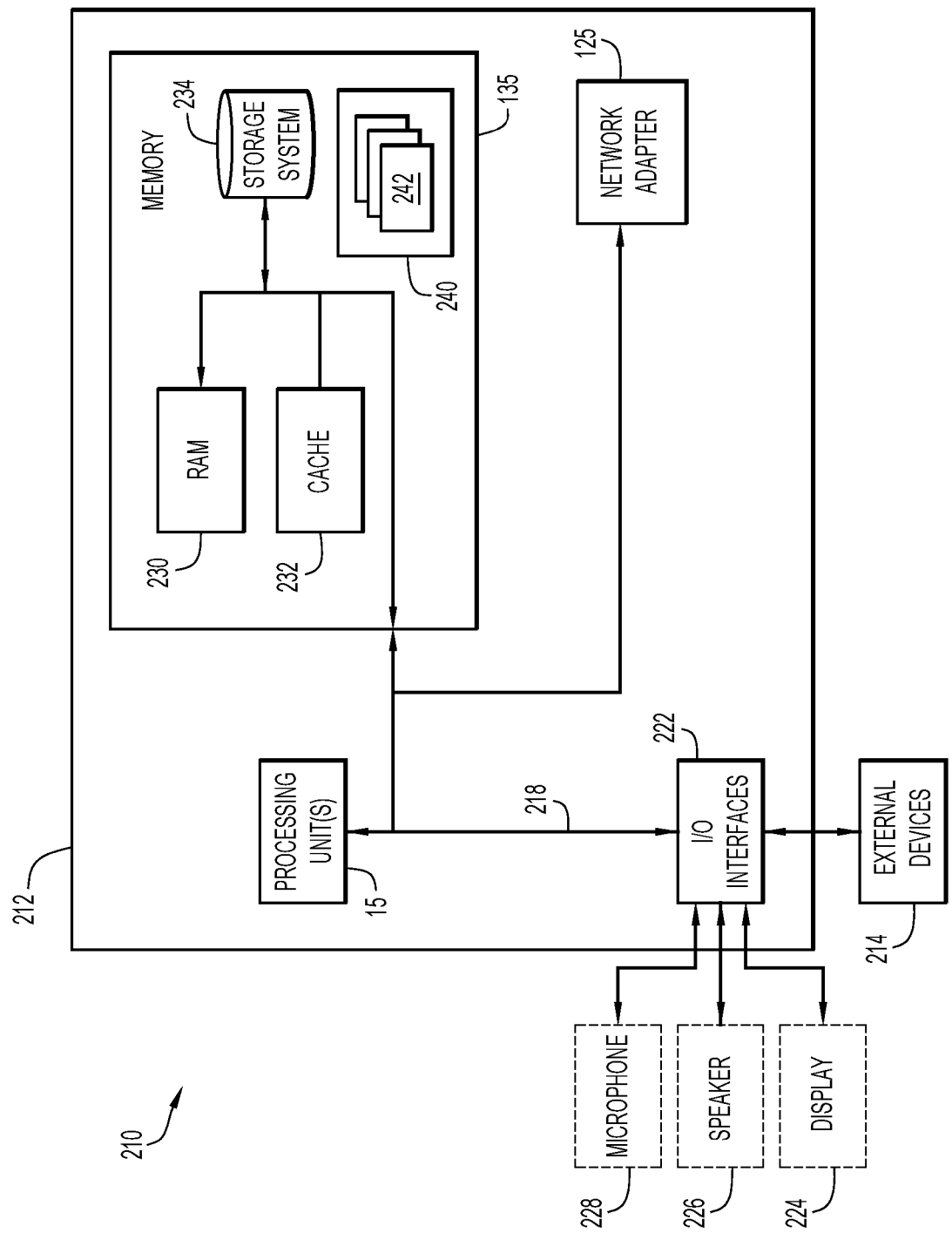
FIG. 2 is a block diagram of a computing device according to an embodiment of the present invention.

Referring now to FIG. 2, a schematic of an example of a computing device 210 of computing environment 100 (e.g., server systems 10, client systems 14(1)-14(N)) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments, smart speakers, and mobile or portable electronic devices that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one speech to text conversion module 16, text translation module 18, text analysis module 20, media matching module 22, and/or user interface module 28, etc.) of program modules that are configured to carry out the functions of embodiments of the invention.

Program/utility 240, having a set (at least one) of program modules 242 (e.g., at least one speech to text conversion module 16, text translation module 18, text analysis module 20, media matching module 22, and/or user interface module 28, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, one or more speakers 226, and one or more microphones 228, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
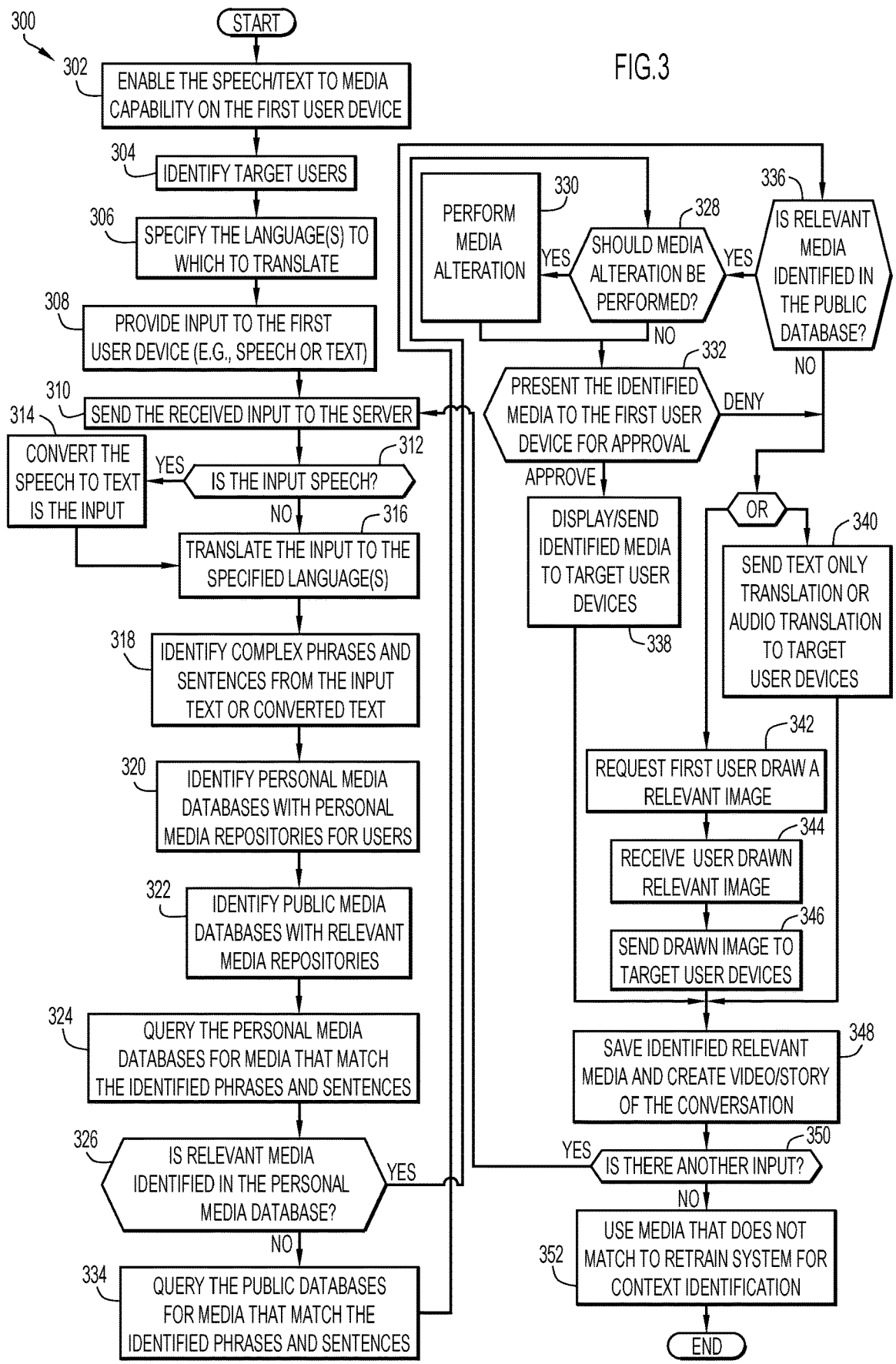
FIG. 3 is a procedural flow chart for converting speech or text input on a first user device into contextually relevant media for secondary users according to an embodiment of the present invention.

Turning to FIG. 3, illustrated is a flowchart that represents an example embodiment of a method 300 of translating a speech or text input received by a first user to contextually relevant media for display by target users in accordance with the present invention. This method 300 enables two or more users that do not speak the same language to communicate with one another by presenting to each other contextually relevant media (e.g., images, videos, etc.). The method 300 includes, at 302, a first user enabling the speech/text media capability on their client system or user device 14(1). As previously explained, the user device 14(1) of the first user may be any type of computing system, including, but not limited to, a personal computer system, a portable electronic device, a smart speaker, etc. Step 302 may be completed by the user opening or activating the user interface module 28 on their user device 14(1). The first user may then be prompted, at 304, by the user interface module 28 to identify any target users they wish to communicate with. The target users may be any number of users, and may be of any proximity to the first user and the first user device 14(1). The first user, at 306, may then specify the language(s) to which to translate the speech/text input. The specified language(s) may be the native spoken or readable languages of the target users identified at 304. Conversely, in another embodiment, after the target users have been identified, the server systems 10 may have received indications from the target users and the target user devices 14(2)-14(N) of their native languages. Thus, the server systems 10 may be informed, after the target users are identified in step 304, of which languages the incoming speech and/or text should be translated into.

Continuing with FIG. 3, the first user, at 308, may then provide to the first user device 14(1) an input by speaking into the microphone 228 of the first user device 14(1) or by typing a series of text into the first user device 14(1). For example, when the first user device 14(1) is a smart speaker, the first user may only be able to speak into the microphone 228 of the smart speaker to provide an input. Conversely, when the first user device 14(1) is a portable electronic device (e.g., smartphone, tablet, phablet, laptop, etc.), the first user may be able to provide the input by either speaking into the microphone 228 of the first user device or typing a series of text via an input device (i.e., physical keyboard, capacitive interface display 224, etc.). At 310, the first user device 14(1) may then send the received input to the server systems 10 via network 12. In some embodiments, this may occur in real time as the first user device 14(1) receives the input at 308.

At 312, the server systems 10 determine whether the received input is speech or text. If the input received at 310 is speech, the server systems 10, at 314, convert the speech to text using the speech to text conversion module 16. The speech to text conversion may be accomplished via any conventional or other techniques (e.g., IBM Watson® etc.; IBM Watson® and all IBM Watson®-based trademarks and logos are trademarks or registered trademarks of International Business Machines Corporation and/or its affiliates). For example, the speech to text conversion may be accomplished by machine learning models that are trained with data sets including audio signals and corresponding text. The machine learning models may include any type of machine learning models (e.g., feed-forward, recurrent, or other neural networks, classifiers, etc.) that receive speech or audio signals and produce or indicate the corresponding text.

After the input speech is converted to text at 314, or, if at 312 the received input was text and not speech, the server systems 10, at 316, translate the received input to the specified or indicated language(s) of the target users via the text translation module 18. The language translation may be accomplished via any conventional or other techniques (e.g., IBM Watson®, etc.). For example, the language translation may be accomplished by machine learning models that are trained with data sets including input words or phrases of an initial language and the corresponding target language translation. The machine learning models may include any type of machine learning models (e.g., feed-forward, recurrent, or other neural networks, classifiers, etc.) that receive the source language input and produce or indicate the target language translation.

At 318, the server systems 10 may analyze the received text or the converted text to identify context and complex phrases and/or sentence structures present in the text via the text analysis module 20. The identification may be accomplished via any conventional or other natural language processing or other techniques (e.g., IBM Watson®, etc.). For example, the identification may include performing various natural language processing techniques (e.g., entity detection, relationship detection, part-of-speech (POS) tagging, syntactic parsing, context analysis, etc.) to analyze and identify complex phrases or sentence structures in the text. This may further be accomplished by employing machine learning models that are trained with data sets including various sentences, phrases and/or words and corresponding classifications (e.g., complexity, structure, etc.). The machine learning models may include any type of machine learning models (e.g., feed-forward, recurrent, or other neural networks, classifiers, etc.) that receive the text and produce or indicate classifications (e.g., complexity, context, etc.).

At 320, the server systems 10 may then identify personal media databases of the first user and the target users from which the server systems 10 may search and/or query for relevant media files. Each of the personal media databases may be a database owned, maintained, and/or managed by the first user or the target users, and may be configured to store images, videos, and other types of media that are personal to the first user and/or target users. In some embodiments, the personal media databases 30 may be stored locally on the user devices or client systems 14 of the users, while in other embodiments, the personal media databases 26 may be cloud repositories that are located remotely from the user devices 14(1)-14(N) (i.e., the personal media databases 26 are not local to the user devices or client systems 14). When the personal media databases 26 are located remotely from the user devices 14(1)-14(N), the personal media databases 26 may be cloud based media repositories such as, but not limited to, Google® Photos, Amazon® Photos, Flickr, etc. In even further embodiments, when the personal media databases 26 are located remotely from the user devices, the personal media databases 26 may be linked to the social media accounts of the relevant users, such as, but not limited to, Facebook, Instagram, Snapchat, etc. (Google® Photos, Amazon® Photos, Flickr®, Facebook®, Instagram®, Snapchat®, Unsplash®, YouTube®, Unsplash®, Giphy®, and all other trademarks and logos discussed herein are trademarks or registered trademarks of their respective owners)

At 322, the server systems 10 may then identify public media databases 24 from which the server systems 10 may search and/or query for relevant media files. These databases 24 may be accessible via the internet, and may be configured to store images, videos, and other types of media. In some embodiments, the public media databases 24 may include, but are not limited to the media databases of Google® Images, Unsplash, YouTube® videos, Giphy®, etc.

Continuing with FIG. 3, after the server systems 10 have identified the context and complex phrases in the received input, and after the server systems 10 have identified the possible databases 24, 26, 30 from which to search for relevant media of the identified context and complex phrases, the server systems 10, at 324, query the personal media databases 26, 30 for media that is relevant to, or matches, the identified phrases and context from the input via the media matching module 22. The server systems 10 use the media matching module 22 to query the personal media databases 26, 30, where the media matching module 22 may employ conventional or other techniques (e.g., IBM Watson®, etc.) to retrieve images. For example, media matching module 22 may comprise artificial intelligence or machine learning models. The artificial intelligence or machine learning models may enable the server systems 10 to determine pre-learned/pre-defined media that are associated with the identified context and complex phrases. The determined pre-defined media are compared to the media available in the personal media databases 26, 30 to determine media associated with the identified context and complex phrases. The machine learning models may be trained with data sets including various text and corresponding pre-defined images to learn the associations, and with the pre-defined images and training images for image comparisons. The machine learning models may include any quantity of any type of machine learning models (e.g., feed-forward, recurrent, or other neural networks, classifiers, etc.) that receive the text and produce or indicate the pre-defined images and/or resulting images in the personal media databases. The machine learning models may also receive the pre-defined images associated with text and produce or indicate the corresponding images in the personal media databases.

At 326, the server systems 10 determine whether or not relevant media was located in the personal media databases 26, 30. If, at 326, the server systems 10 locate or identify media in the personal media databases 26, 30, the server systems 10, at 328, determine whether or not an alteration of the identified relevant should be performed. This may include, but is not limited to, compiling one or more of the relevant media together (i.e., when multiple relevant media are identified), compiling portions of the one or more media together (i.e., when multiple relevant media are identified), and/or embedding or imposing a text translation of the received input onto the identified media. In some embodiments, this decision may have been previously indicated by the first user when operating the user interface module 28 of the first user device 14(1) to initiate the speech/text to media capability, or, in other embodiments, the first user device 14(1) may be prompted with the inquiry of whether or not media alteration should be performed (e.g., whether or not to include a text translation of the received input). If, at 328, an alteration of the identified relevant media is desired, then, at 330, the server systems 10 perform an alteration of the identified relevant media. After the server systems 10 perform the alteration of the identified relevant media at 330, or if alteration of the identified relevant media is not desired at 328, the server systems 10, at 332, may present the identified media, altered or unaltered, to the first user device 14(1) for the first user to approve or disapprove of the identified media as media that accurately represents their input.

Returning to step 326, if after querying the personal media databases 26, 30 in step 324, the server systems 10 do not identify any relevant media, then, at 334, the server systems 10 query the public media databases 24 for media that is relevant to, or matches, the identified phrases and context from the input via the media matching module 22. Similar to step 324, the server systems 10 use the media matching module 22 to query the public media databases 24, where the media matching module 22 may comprise artificial intelligence or machine learning models. The artificial intelligence or machine learning models may enable the server systems 10 to compare pre-learned/pre-defined media that are associated with the identified context and complex phrases to the media available in the public media databases 24 in substantially the same manner described above.

At 336, the server systems 10 determine whether or not relevant media was located in the public media databases 24. If, at 336, the server systems 10 locate or identify media in the public media databases 24, the server systems 10 return to steps 328, 330, and 332 to determine if an alteration is desired of the identified relevant media, alter the identified relevant media if desired, and present the identified media to the first user device 14 of the first user to approval, as explained above.

At step 332, the server systems 10 may present the identified media, with or without the translation text, and regardless of whether or not the identified media was located in a personal media databases 26, 30 or a public media database 24, to the first user device 14 for the first user to approve or disapprove of the identified media as media that accurately represents the received input. If, at 332, the first user approves of the identified media, whether or not that media has been located in a personal media database 26, 30 or a public media database 24, then, at 338, the server systems 10 sends the identified media, with or without the translation text, to the user devices or client systems 14 of the relevant users identified at 304 so that the user devices or client systems 14 can display the identified media. Conversely, if the user does not approve of the identified media, then the server systems 10 may proceed in one of two manners, depending on the embodiment of the server systems 10. In one embodiment, the server systems 10 may, at 340, decide to send the translation text or an audible translation of the received input to the relevant user devices. The text to speech/audio conversion may be accomplished by speech to text conversion module 16 via any conventional or other techniques (e.g., IBM Watson®, etc.). For example, the text to speech/audio conversion may be accomplished by machine learning models that are trained with data sets including text and corresponding audio signals. The machine learning models may include any type of machine learning models (e.g., feed-forward, recurrent, or other neural networks, classifiers, etc.) that receive text and produce or indicate the corresponding speech or audio signals. The resulting speech or audio signals may be transformed to an audio file format for transmission.

In another embodiment, the server systems 10 may, at 342, request that the first user draw a relevant image on their first user device 14. In even further embodiments, the server systems 10 may not present the identified media to the first user on the first user device 14, and instead, may simply send any identified media to the relevant media devices.

In some embodiments, the server systems 10 may not perform all or some of steps 328, 330, and 332, and instead, after locating relevant media in any of the databases 24, 26, 30 in steps 326 or 336, the server systems 10 may simply send or display the identified media to the target users on their user devices 14(2)-14(N) at step 338.

Returning to step 336, if the server systems 10 do not locate or identify relevant media in either of the personal media databases 26, 30 or the public media databases 24, then the server systems 10 may proceed by either sending the translation text or an audible translation of the received input to the relevant user devices at 340, or may request that the first user draw a relevant image on their first user device 14(1) at 342. If, at 342, the server systems 10 requests that the user draw a relevant image on the first user device 14(1), then, at 344, the server systems 10 may receive the image drawn by the first user from the first user device 14(1). Once the server systems 10 receive the relevant drawn image, the server systems 10 may, at 346, send the first user drawn image to the user devices 14(2)-14(N) of the target users.

At 348, the server systems 10 saves the media that was sent to the user devices 14(2)-14(N) of the target users, whether that is identified media from the public or personal media databases 24, 26, 30 (i.e., step 338), translation text or audible translation of the received input (i.e., step 340), or the user drawn image (i.e., step 346). The server systems 10, at 348, save the media sent to the target users in order to create a history of the conversation between the first user and the target users, which includes the possibility of converting a series of saved media files into a video/story of the conversation.

At 350, the server systems 10 determines whether or not there are any further inputs received by any of the user devices or client systems 14(1)-14(N). This could be from the first user device 14(1) that provided the initial input received at 308, or received from one of the user devices 14(2)-14(N) belonging to one of the target users that is conversing with the first user. If, at 350, the server systems 10 determines that another input is received by one of the user devices 14(1)-14(N), the server systems 10 return to step 310 to begin the process of identifying media that is contextually relevant and representative of the newly received input. Conversely, if, at 350, the server systems determines that no other inputs have been received by the user devices 14(1)-14(N), then the server systems 10, at 352, may perform machine learning training to improve the identification of the relevant media files (i.e., to improve the performance and accuracy of the media matching module 22). At 352, the server systems 10 may use media that did not match from the public or personal media databases 24, 26, 30, or may use feedback from the first user at step 332, to retrain machine learning models of any of modules 16, 18, 20, 22.

In accordance with the embodiment illustrated in FIG. 3, the server systems 10 searches the personal media databases 26, 30 prior to searching the public media databases 24 because, if matching relevant and representative media can be located in the personal media databases 26, 30, that media may be familiar and more relevant to one or all of the target users identified in step 304, which increases the contextual understanding of the target users when determining what the first user is attempting to communicate. In other words, using media that are familiar to the first user or the identified target users increases the chances that the identified target users understand the message that the user providing the input is attempting to communicate to them. For example, if the first user is attempting to tell the target users that they "feel like they are on top of the world," an image displaying the first user on top of a mountain may be more contextually relevant and representative to the target users of the first user's expression than simply an image of a mountain.

Figure 4:
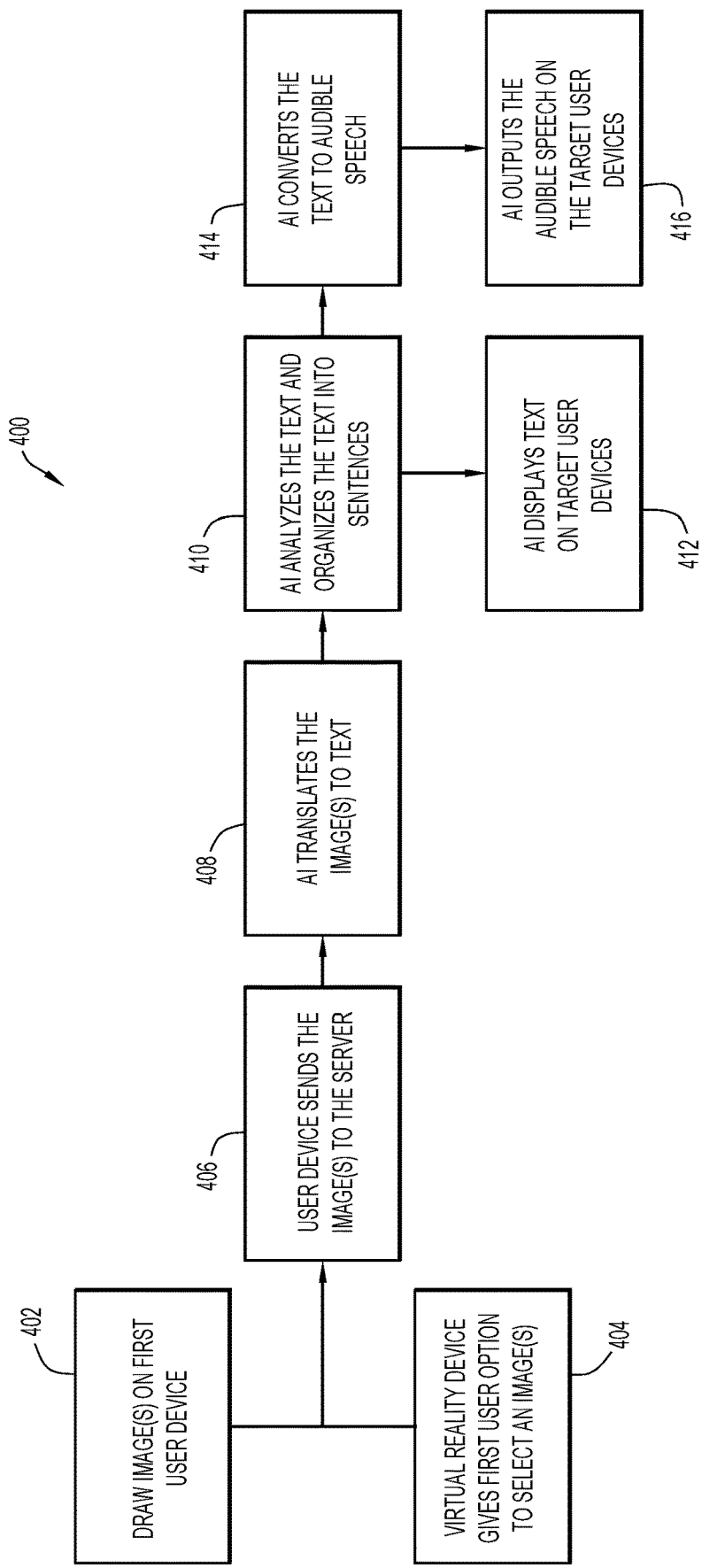
FIG. 4 is a flow diagram for converting a drawn or chosen image by a first user into contextually relevant speech or text for secondary users according to an embodiment of the present invention.

Turning to FIG. 4, illustrated is a flow diagram that represents an example embodiment of a method 400 of converting one or more images to a native language of a user in accordance with the present invention to enable two or more users that do not speak the same language to communicate with one another. The method 400 illustrated in FIG. 4 may be best used when one user does not have the necessary reading and writing skills to communicate with the method 300 illustrated in FIG. 3, or has other communication difficulties such as, but not limited to, being deaf and/or mute. The method 400 illustrated in FIG. 4 enables a user to draw or select an image that conveys a message they wish to communicate to one or more target users, and the computing environment 100 is configured to convert the image received from the first user into a series of text and/or an audible output for the other users.

As illustrated in FIG. 4, at 402, a first user may draw an image on their first user device or client system 14(1) via the user interface module 28. Conversely, or in another embodiment, at 404 the first user may use virtual reality features of their first user device 14(1) to draw or select a series of images via a virtual reality environment. In even further embodiments, the virtual reality environment may present the first user with an augmented reality environment of the environment or world surrounding the first user to further enable the user to select or capture relevant images to convey to the target users. Once the first user has drawn or chosen their desired image(s), the first user device 14(1), at 406, sends the image(s) to the server systems 10. At 408, the artificial intelligence of the server systems 10 translates the received image(s) to text. The server systems 10 may use media matching module 22 to determine a set of text that is contextually representative of the received image(s), where the media matching module 22 may employ any conventional or other techniques (e.g., IBM Watson®, etc.) to determine the text. For example, media matching module 22 may comprise artificial intelligence or machine learning models. The artificial intelligence or machine learning models may enable the server systems 10 to determine pre-learned/pre-defined media that are associated with the received image. The determined pre-defined media are associated with corresponding words or vocabulary. The machine learning models may be trained with data sets including pre-defined images and corresponding text to learn the associations. The machine learning models may include any type of machine learning models (e.g., feed-forward, recurrent, or other neural networks, classifiers, etc.) that receive the image and produce or indicate the corresponding text. The server systems 10 may convert the images to text in the native language of the target user(s) that are communicating with the first user. This may be accomplished by language translation of the corresponding text, or by training the machine learning models to learn the associations for specific languages.

Continuing with FIG. 4, at 410, the server systems 10 then analyze the converted text and organize the converted text into a sentence structure. The server systems 10 may use text analysis module 20 to determine the sentence structure of text. The identification of sentence structure may be accomplished via any conventional or other natural language processing or other techniques (e.g., IBM Watson®, etc.). For example, the identification of sentence structure may include performing various natural language processing techniques (e.g., entity detection, relationship detection, part-of-speech (POS) tagging, syntactic parsing, context analysis, etc.) to analyze and identify the sentence structure in the text. This may further be accomplished by employing machine learning models that are trained with data sets including various sentences, phrases and/or words and corresponding classifications (e.g., structure, etc.). The machine learning models may include any type of machine learning models (e.g., feed-forward, recurrent, or other neural networks, classifiers, etc.) that receive the text and produce or indicate classifications (e.g., structure, etc.).

At 412, the server systems 10 send the text, in the proper sentence structure, to the user devices or client systems 14(2)-14(N) of the target users that are communicating with the first user so that the target user devices 14(2)-14(N) can display the text to the target user.

Either simultaneously or alternatively, at 414, the server systems 10 convert the organized text into audible speech. The text to speech/audio conversion may be accomplished by speech to text conversion module 16 in substantially the same manner described above, and the resulting speech/audio is transformed into an audio file format. At 416, the server systems 10 sends the audio file to the target user devices 14(2)-14(N) of the target users that are communicating with the first user so that the target user devices 14(2) can output audio of the formulated text to the target user.

Figure 5A:
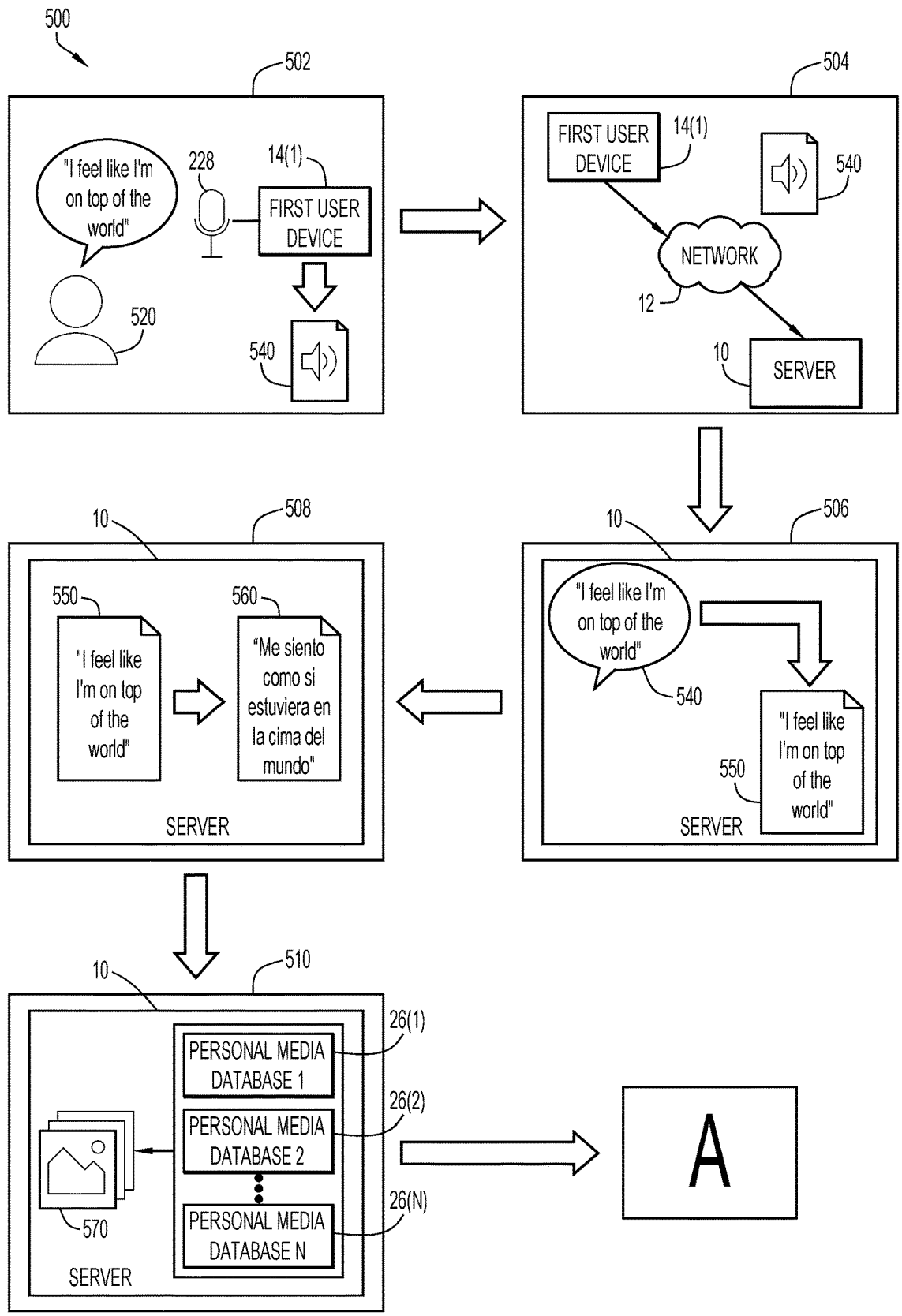
FIGS. 5A and 5B are an example implementation of two users utilizing an embodiment of the present invention to communicate with one another.
Figure 5B:
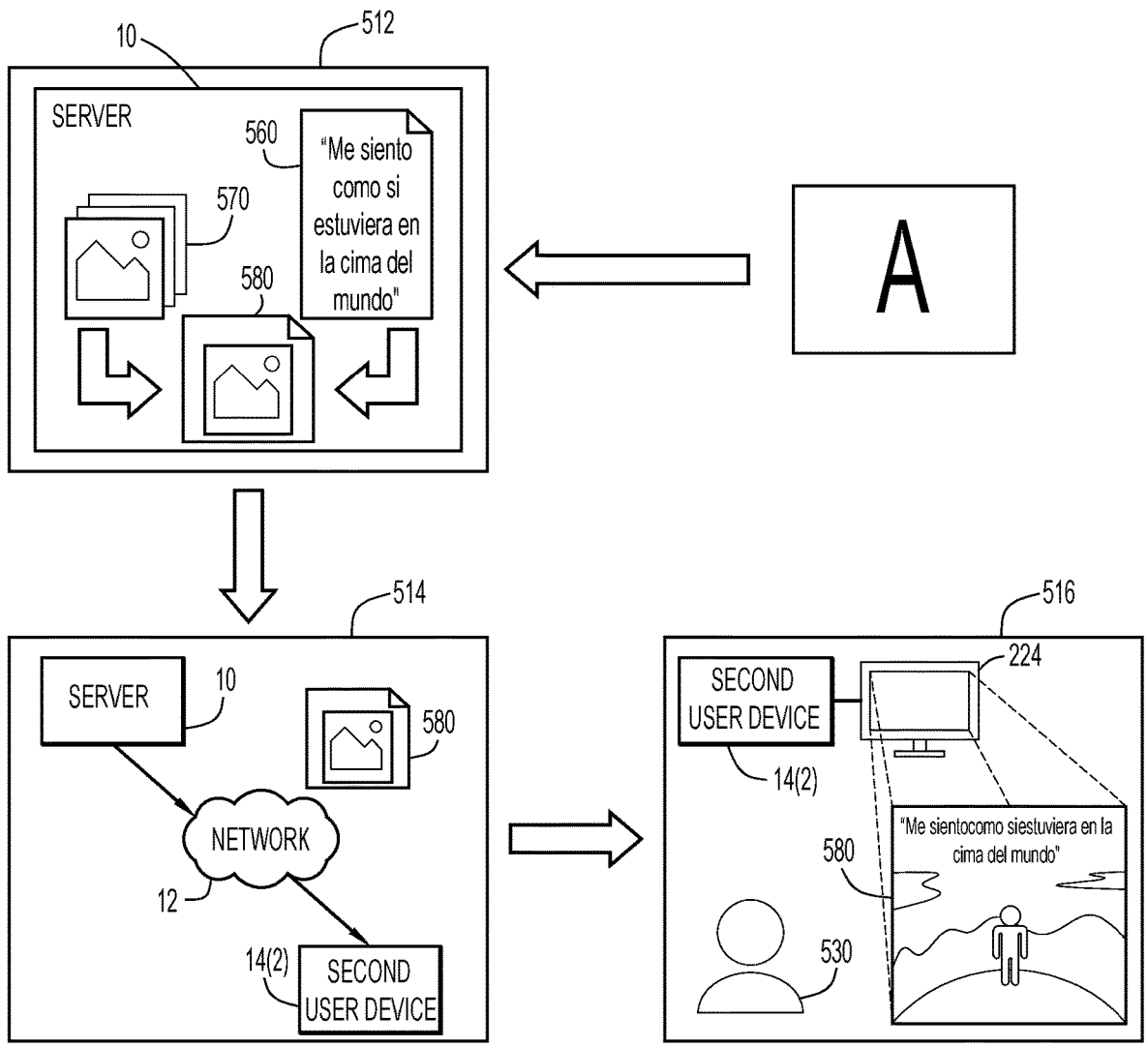

Turning to FIGS. 5A and 5B, illustrated is an example implementation of the computing environment 100 to enable two users (i.e., the first user 520 and the second user 530) to communicate with one another when they do not speak the same native language by converting speech to a contextually relevant media file. As illustrated in FIG. 5A, in box 502, the first user 520 speaks into the microphone 228 of the first user device 14(1). In the example implementation, the first user 520 says "I feel like I'm on top of the world" into the microphone 228 of the first user device 14(1). The first user device 14(1), at box 502 may record the received speech into an audio file 540. At box 504, the first user device 14(1) sends the audio file 540 to the server systems 10 via the network 12. At box 506, the server systems 10 use the speech to text conversion module 16 to convert the speech of the received audio file 540 into the text 550. Furthermore, at box 508, the server systems 10 utilize the text translation module 18 to translate the converted text 550, which is in a first language, to a translated text 560, which is in a second language. In the illustrated example, the phrase "I feel like I'm on top of the world," which is in English, is translated into Spanish such that the translated text 560 reads "Me siento como si estuviera en la cima del mundo." At box 510, the server systems 10 use the media matching module 22 to search multiple personal media databases 26(1)-26(N) that are linked to the first user 520, the second user 530, or both the first and second users 520, 530. As previously explained, these personal media databases 26(1)-26(N) may be cloud databases (e.g., Google® photos, Amazon® Photos, Flikr®, etc.) that were created and managed by one or both of the users 520, 530, may be social media accounts (e.g., Facebook®, Instagram®, Snapchat®, Twitter® (Twitter® and all Twitter®—based trademarks and logos are trademarks or registered trademarks of Twitter, Inc. and/or its affiliates), etc.), and may be personal media databases 30 that are local to the first and second user devices 14(1), 14(2) (as illustrated in the computing environment 100 of FIG. 1). As shown in box 510, using the medial matching module 22, the server systems 10 locate or identify a relevant image 570 of the converted text 550 from one of the personal media databases 26(1)-26(N), and acquire a copy of the relevant image 570.

Turning to FIG. 5B, at box 512, the server systems 10 may then, in some embodiments, impose or embed the translated text 560 onto the identified relevant image 570 to create a modified image 580 that contains a portion or all of the translated text 560. At box 514, the server systems 10 may then send the modified image 580 to the second user device 14(2) via the network 12. At box 516, the second user device 14(2) may display on a display device 224 the modified image 580 for the second user 530 to view and gain an understanding of what the first user 520 was trying to communicate to the second user 530 when the first user 520 said "I feel like I'm on top of the world."

The embodiments described above and illustrated in the drawings enable two or more users to communicate with one another through the automatic presentation of contextually relevant media on user devices when the two or more users speak and understand different native languages. The present invention embodiments improve upon current text translators, which are only capable of translating text or speech from one language to another, by converting text or speech to contextually relevant media in real time. Automatically converting speech or text inputs into contextually relevant media, and automatically presenting and displaying the contextually relevant media on user devices, enables real time communication between a user and another user speaking in an unfamiliar language because the user devices are receiving, in real time, the contextually relevant media that accurately portrays what is being said during the conversation (since an image provides a rapid understanding of a phrase, sentence, or series of sentences, relative to a phrase, sentence, or series of sentences). Furthermore, simultaneously displaying media that corresponds to what another user is saying may provide translations for words without a direct word translation to enhance the communication session.

In addition, by searching through personal media databases and repositories prior to searching through public media databases and repositories, the present invention embodiments are able to provide and present media to the user devices that provide a greater understanding, and are more representative of the input, than simply searching publically available media databases and repositories. Embedding the translation into the identified contextually relevant media provides an enhanced translation of what another user is saying.

It will be appreciated that the embodiments described above and illustrated in the drawings represent only a few of the many ways of implementing embodiments for converting speech and/or text received on one user device or client system to a contextually relevant media file for display on another user device or client system to facilitate communication between two or more users that do not speak the same language.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, smart speaker, etc.), and may include any commercially available operating system and any combination of commercially available and custom software (e.g., browser software, communications software, server software, speech to text conversion module 16, text translation module 18, text analysis module 20, media matching module 22, etc.). These systems may include any types of monitors and input devices (e.g., keyboard, mouse, microphones, voice recognition, etc.) to enter and/or view information.

It is to be understood that the software (e.g., speech to text conversion module 16, text translation module 18, text analysis module 20, media matching module 22, user interface module 28, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts or diagrams may be modified in any manner that accomplishes the functions described herein. In addition, the functions in the flowcharts, diagrams, or description may be performed in any order that accomplishes a desired operation.

The software of the present invention embodiments (e.g., speech to text conversion module 16, text translation module 18, text analysis module 20, media matching module 22, user interface module 28, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., audio files, image files, movie files, text files, translation files, etc.). The database system may be implemented by any number of any conventional or other databases, data stores or storage structures (e.g., files, databases, data structures, data or other repositories, etc.) to store information (e.g., audio files, image files, movie files, text files, translation files, etc.). The database system may be included within or coupled to the server and/or client systems. The database systems and/or storage structures may be remote from or local to the computer or other processing systems, and may store any desired data (e.g., audio files, image files, movie files, text files, translation files, etc.).

The present invention embodiments may employ any number of any type of user interface (e.g., Graphical User Interface (GUI), command-line, prompt, etc.) for obtaining or providing information (e.g., audible speech, textual messages, images, videos, translation languages, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, microphone, voice recognition, etc.). The interface screens may include any suitable actuators (e.g., links, tabs, etc.) to navigate between the screens in any fashion.

The report or data presented to various users on the user devices or client systems may include any information arranged in any fashion, and may be configurable based on rules or other criteria to provide desired information to a user (e.g., contextually relevant images, translated text, translation languages, etc.).

The present invention embodiments are not limited to the specific tasks or algorithms described above, but may be utilized for presenting contextually relevant media to users attempting to communicate with one another, but that do not speak the same language as one another, by converting spoken words or written text of one user and automatically converting the spoken words or written text to a contextually relevant image to display for other users.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for speech to media translation comprising:
   receiving, via a processor, an input in a first language and a command to translate the input into a second language associated with a target user, wherein the input comprises text and/or audio converted to text;
   translating, via the processor, the input to the second language to produce translated text searching, via a neural network of the processor, an image database based on the input to retrieve contextually relevant images for the input, wherein the neural network is trained with training text and pre-defined images and processes the input to indicate the contextually relevant images for the input in the image database;
   altering, via the processor, the retrieved contextually relevant images by compiling together portions of two or more of the retrieved contextually relevant images and embedding the translated text; and
   communicating, via the processor, the altered contextually relevant images to the target user to convey a translation of the input.

2. The method of claim 1, wherein the input is received from a first user and the image database is a personal image database.

3. The method of claim 2, wherein the personal image database is on a mobile device or on a cloud repository.

4. The method of claim 1, wherein the input is received from a first user and the image database is a public image database.

5. The method of claim 1, further comprising:
   searching a video database based on the input to retrieve contextually relevant videos; and
   communicating retrieved contextually relevant videos to the target user.

6. The method of claim 1, wherein the input is received from a first user, the method further comprising:
   prompting the target user to draw an image via an interface of a mobile device of the target user; and communicating the image drawn by the target user to the first user.

7. A system for speech to media translation comprising:
at least one processor configured to:
- receive an input in a first language and a command to translate the input into a second language associated with a target user, wherein the input comprises text and/or audio converted to text;
- translate the input to the second language to produce translated text;
- search, via a neural network, an image database based on the input to retrieve contextually relevant images for the input, wherein the neural network is trained with training text and pre-defined images and processes the input to indicate the contextually relevant images for the input in the image database;
- alter the retrieved contextually relevant images by compiling together portions of two or more of the retrieved contextually relevant images and embedding the translated text; and
- communicate the altered contextually relevant images to the target user to convey a translation of the input.

8. The system of claim 7, wherein the input is received from a first user and the image database is a personal image database.

9. The system of claim 8, wherein the personal image database is on a mobile device or on a cloud repository.

10. The system of claim 7, wherein the input is received from a first user and the image database is a public image database.

11. The system of claim 7, wherein the at least one processor is further configured to:
- search a video database based on the input to retrieve contextually relevant videos; and
- communicate retrieved contextually relevant videos to the target user.

12. The system of claim 7, wherein the input is received from a first user, and the at least one processor is further configured to:
- prompt the target user to draw an image via an interface of a mobile device of the target user; and
- communicate the image drawn by the target user to the first user.

13. A computer program product for speech to media translation, the computer program product comprising one or more computer readable storage media having program instructions collectively stored on the one or more computer readable storage media, the programmable instructions executable by a processor to cause the processor to:
- receive an input in a first language and a command to translate the input into a second language associated with a target user, wherein the input comprises text and/or audio converted to text;
- translate the input to the second language to produce translated text;
- search, via a neural network, an image database based on the input to retrieve contextually relevant images for the input, wherein the neural network is trained with training text and pre-defined images and processes the input to indicate the contextually relevant images for the input in the image database;
- alter the retrieved contextually relevant images by compiling together portions of two or more of the retrieved contextually relevant images and embedding the translated text; and
- communicate the altered contextually relevant images to the target user to convey a translation of the input.

14. The computer program product of claim 13, wherein the input is received from a first user and the image database is a personal image database.

15. The computer program product of claim 14, wherein the personal image database is on a mobile device or on a cloud repository.

16. The computer program product of claim 13, wherein the input is received from a first user and the image database is a public image database.

17. The computer program product of claim 13, wherein the program instructions further cause the processor to:
- search a video database based on the input to retrieve contextually relevant videos; and
- communicate retrieved contextually relevant videos to the target user.

* * * * *